US010477838B2

(12) United States Patent
Dertsakyan

(10) Patent No.: US 10,477,838 B2
(45) Date of Patent: Nov. 19, 2019

(54) PET CHEW TOY FOR DENTAL SELF-CLEANING BY DOMESTIC PETS

(71) Applicant: Peter Dertsakyan, North Holllywood, CA (US)

(72) Inventor: Peter Dertsakyan, North Holllywood, CA (US)

(*) Notice: Subject to any disclaimer, the term of this patent is extended or adjusted under 35 U.S.C. 154(b) by 0 days.

(21) Appl. No.: 15/472,206

(22) Filed: Mar. 28, 2017

(65) Prior Publication Data

US 2018/0295811 A1 Oct. 18, 2018

Related U.S. Application Data

(60) Provisional application No. 62/314,353, filed on Mar. 28, 2016.

(51) Int. Cl.
*A01K 15/02* (2006.01)
*A46B 9/02* (2006.01)
*A46B 1/00* (2006.01)

(52) U.S. Cl.
CPC .............. *A01K 15/026* (2013.01); *A46B 1/00* (2013.01); *A46B 9/026* (2013.01); *A46B 2200/1086* (2013.01)

(58) Field of Classification Search
USPC ......... 119/702, 709–711; D30/160; 426/805, 426/144, 143, 104; 433/1; 424/442, 49
See application file for complete search history.

(56) References Cited

U.S. PATENT DOCUMENTS

| | | | | | |
|---|---|---|---|---|---|
| 1,408,520 | A | * | 3/1922 | Larsen | 401/183 |
| 3,007,441 | A | * | 11/1961 | Eyer | A01K 13/002 15/167.1 |
| 3,853,412 | A | * | 12/1974 | Griffin | A46B 11/0041 15/104.061 |
| 5,072,481 | A | * | 12/1991 | Frank Weyer | A46B 5/0054 15/167.2 |
| D325,821 | S | * | 5/1992 | Schwartz | D4/106 |
| 5,360,026 | A | * | 11/1994 | Klinkhammer | A46B 5/002 132/308 |
| 5,407,287 | A | * | 4/1995 | Braun | A46B 11/0017 401/176 |
| 5,497,526 | A | * | 3/1996 | Klinkhammer | A46B 5/0012 132/309 |
| 5,711,759 | A | * | 1/1998 | Smith | A61J 17/006 601/139 |

(Continued)

OTHER PUBLICATIONS

Materials relating to Busy Buddy Bristle Bone, from www.chewy.com, obtained Sep. 25, 2018.

(Continued)

*Primary Examiner* — Andrea M Valenti
(74) *Attorney, Agent, or Firm* — David R. Preston

(57) ABSTRACT

A pet chew toy allowing for the self-cleaning of teeth by domestic pets. The pet toy includes one or more cavities into which a pet's teeth may engage, and the inner and outer surfaces of the cavities may have scrubbing elements designed to enhance removal of plaque and other unhygienic products from a pet's teeth and gums. The chew toy may further include projections to enhance stabilization of the chew toy by the pet, and a reservoir and dispensing system for pet toothpaste or similar additive.

17 Claims, 6 Drawing Sheets

(56) References Cited

U.S. PATENT DOCUMENTS

| | | | | |
|---|---|---|---|---|
| 5,842,249 | A * | 12/1998 | Sato | A46B 5/0008 15/167.2 |
| 5,944,516 | A * | 8/1999 | Deshaies | A61D 5/00 15/167.1 |
| D417,319 | S * | 11/1999 | Weiss, Jr. | D30/119 |
| 6,116,191 | A | 9/2000 | Suchowski | |
| 6,148,771 | A * | 11/2000 | Costello | A01K 15/026 119/709 |
| D453,242 | S * | 1/2002 | Kaplan | A01K 15/026 D30/160 |
| 6,405,681 | B1 * | 6/2002 | Ward | A01K 15/026 119/707 |
| 6,739,287 | B1 | 5/2004 | Sarantis | |
| D501,961 | S | 2/2005 | Jager | |
| D564,714 | S * | 3/2008 | Axelrod | D30/160 |
| 7,490,579 | B2 | 2/2009 | Axelrod | |
| D635,309 | S * | 3/2011 | Axelrod | D30/160 |
| 8,166,600 | B2 * | 5/2012 | Lee | A46B 5/0062 15/167.1 |
| 8,807,088 | B2 | 8/2014 | Axelrod | |
| 8,935,992 | B2 * | 1/2015 | Axelrod | A01K 15/025 119/709 |
| D771,326 | S * | 11/2016 | Lai | D30/160 |
| 9,744,014 | B2 * | 8/2017 | Smith | A61C 19/04 |
| 9,770,010 | B2 * | 9/2017 | Wechsler | A01K 15/026 |
| 2002/0083539 | A1 * | 7/2002 | Bella | A46B 5/0016 15/106 |
| 2004/0137118 | A1 | 7/2004 | Axelrod | |
| 2004/0216693 | A1 | 11/2004 | Handelsman | |
| 2005/0015908 | A1 * | 1/2005 | Hanlon | A46B 5/02 15/167.2 |
| 2006/0150919 | A1 * | 7/2006 | Thomason | A01K 15/026 119/710 |
| 2007/0015100 | A1 * | 1/2007 | Morris | A61D 5/00 433/1 |
| 2007/0101946 | A1 * | 5/2007 | Penny | A01K 13/00 119/709 |
| 2009/0208898 | A1 * | 8/2009 | Kaplan | A46B 9/045 433/80 |
| 2009/0276972 | A1 * | 11/2009 | Dugan | A46B 7/00 15/167.2 |
| 2011/0011351 | A1 * | 1/2011 | Simoni | A01K 15/026 119/709 |
| 2013/0266905 | A1 * | 10/2013 | Smith | A61C 19/04 433/1 |
| 2013/0305999 | A1 * | 11/2013 | Axelrod | A01K 15/026 119/710 |
| 2014/0060442 | A1 * | 3/2014 | Ressemann | A01K 13/00 119/61.5 |
| 2014/0123421 | A1 * | 5/2014 | Minano Fernandez | A46B 9/045 15/110 |
| 2014/0224184 | A1 * | 8/2014 | Dewey | A01K 15/026 119/709 |
| 2018/0243063 | A1 * | 8/2018 | Coopersmith | A01K 15/026 |

OTHER PUBLICATIONS

Materials relating to Busy Buddy, from www.petsafe.net, obtained Sep. 25, 2018.

Materials relating to Busy Buddy Bristle Bone, from https://ps.factoryoutletstore.com, obtained Sep. 25, 2018.

Materials relating to Busy Buddy Bristle Bone, from https://store/petsafe.net, obtained Sep. 25, 2018.

Materials relating to Nylabone DuraChew Double Action Round Ball Bacon Flavor Dog Toy, from www.chewy.com, obtained Sep. 25, 2018.

Materials relating to Nylabone DuraChew Double Action Dental Chew Bacon Flavor Dog Toy, from www.chewy.com, obtained Sep. 25, 2018.

* cited by examiner

PET CHEW TOY FOR DENTAL SELF-CLEANING BY DOMESTIC PETS

CROSS-REFERENCE TO RELATED APPLICATIONS

The present application claims priority to provisional application 62/314,353, filed Mar. 28, 2016, entitled "Toy for a Domestic Pet to Brush Its Own Teeth" which is incorporated by reference in its entirety herein.

STATEMENT REGARDING FEDERALLY SPONSORED RESEARCH

Not applicable.

JOINT RESEARCH AGREEMENT STATEMENT

Not applicable.

FIELD OF THE INVENTION

The present invention relates to a pet chew toy and dental hygiene system, and particularly to pet chew toy allowing for the dental self-cleaning by domestic pets.

BACKGROUND

Maintaining the dental hygiene of domestic pets is a well-known issue. Like humans, domestic pets such as dogs and cats develop bacterial infections, known generally as plaque, on the surface and in the spaces between the teeth of said pets. In addition to the malodorous breath and appearance of domestic pets suffering from an excess of plaque, it can also precipitate the gum disease gingivitis, damage to the pet's teeth, and other material detriment to the oral health of the pet. If left routinely uncleaned, it can harden and become almost impossible to remove without professional assistance.

Traditional methods of cleaning the teeth of pets has involved labor-intensive manual cleaning by the pet owner, a process which is both time-consuming and often results in unnecessary antagonism between the domestic pet and its owner.

Wild relatives of domestic pets, such as wild dogs and wolves, use the frictional effects of gnawing on bones and other hard objects to clean their teeth of plaque and residual pieces of food. The use of domestic pet chew toys as a method of mimicking these natural dental hygiene methods for domestic pets is known in the art. As a consequence, many domestic animal chews or chew toys have been produced of rawhide or other hard surface and configured in such a way as to mimic the shape and feel of natural bone. Other products have introduced additional artificial features to improve upon the natural cleaning action of a domestic pet's chewing action on bone, such as the use of additional projections on a surface of the chew toy.

Information relevant to attempts to address these problems can be found in US Patent Application No. 2004/0216693 to Handelsman; U.S. Pat. No. 6,116,119 to Suchowski; U.S. Pat. No. 6,739,287 to Sarantis; U.S. Pat. D501,961 to Jager; US Patent Application no. 2004/0137118 to Axelrod; and U.S. Pat. Nos. 8,807,088 and 7,490,579 to Axelrod. However, each one of these references suffers from one or more disadvantages. One consistent failing of existing products relates to a domestic pet's propensity to grip or hold an object between its front paws. Domestic pets will naturally seek to stabilize the subject of their chewing action, allowing for a stronger and more satisfying engagement by the pet's mouth, while increasing the friction applied to the pet's teeth and oral cavity by the bone or chew toy. Another failing of existing products is the inability to use pet toothpaste and other supplementary dental hygiene products in conjunction with the chewing action of the chew toys. This leaves the need for supplementary manual cleaning by the domestic pet owner. Yet another disadvantage of existing products is the lack of differentiated surfaces for inner and outer domestic pet teeth. Domestic pets, such as dogs and cats, have substantially different shape and spacing in their teeth between the front of their mouths, wherein are located canines and other long, large teeth, and the smaller, more closely spaced teeth in the back of the pets' mouths. The differences in size and spacing of these teeth suggest the need for different surfaces with different textures and projections adapted to the particular needs of that portion of the domestic pet's dental structures.

For the foregoing reasons, there is a need for an improved domestic pet chew toy that allows domestic pets to clean their own teeth.

SUMMARY

The present invention is directed to an apparatus that satisfies this need.

One possible embodiment of the invention takes the form of a chew toy for use by a domestic pet such as a dog, cat or other domesticated animal. This embodiment comprises a central member for engagement of a domestic pet's oral cavity, which includes at least one inner surface defining a cavity and an outer surface, each or both of which may have a variety of scrubbing elements affixed to them.

Another possible embodiment comprises a central member for engagement of a domestic pet's oral cavity, said member having a first end and a second end. The second end further comprises one or more projections, which may be circular or otherwise shaped, which are substantially flat and oriented perpendicular to the length of the central member. The projections allow the member to be stood upright and gripped by a domestic pet, using its front paws.

Yet another possible embodiment includes a reservoir running the length of the central member of a chew toy, in which, by way of non-limiting example, flavored toothpaste for domestic pets can be retained. Smaller dispensing holes are present in the central member perpendicular to the reservoir, allowing the toothpaste or other products to be dispensed into the oral cavity of a domestic pet when the central member is engaged by said pet's oral cavity.

BRIEF DESCRIPTION OF THE DRAWINGS

These and other features, aspects, and advantages of the present invention will become better understood with reference to the following description, appended claims, and drawings where:

DETAILED DESCRIPTION

In the Summary above and in the Detailed Description, and the claims below, and in the accompanying drawings, reference is made to particular features of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components.

The term "at least" followed by a number is used herein to denote the start of a range beginning with that number (which may be a range having an upper limit or no upper limit, depending on the variable being defined). For example, "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40%" means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm.

Figure 1:
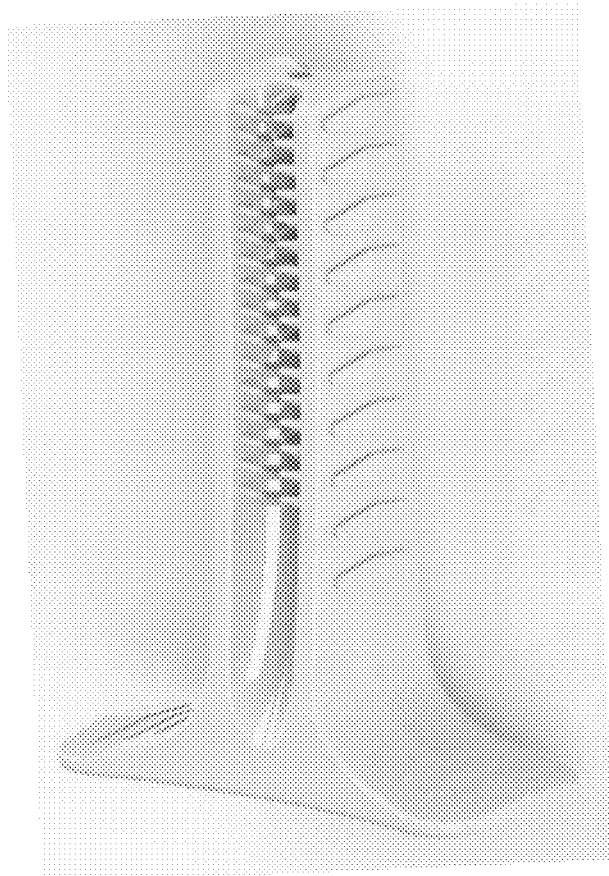
FIG. 1 shows an embodiment of the invention having a central member with an inner surface defining a cavity, perpendicular stabilizing projections, and a plurality of scrubbing elements on the inner and outer surfaces of the central member.
Figure 6:
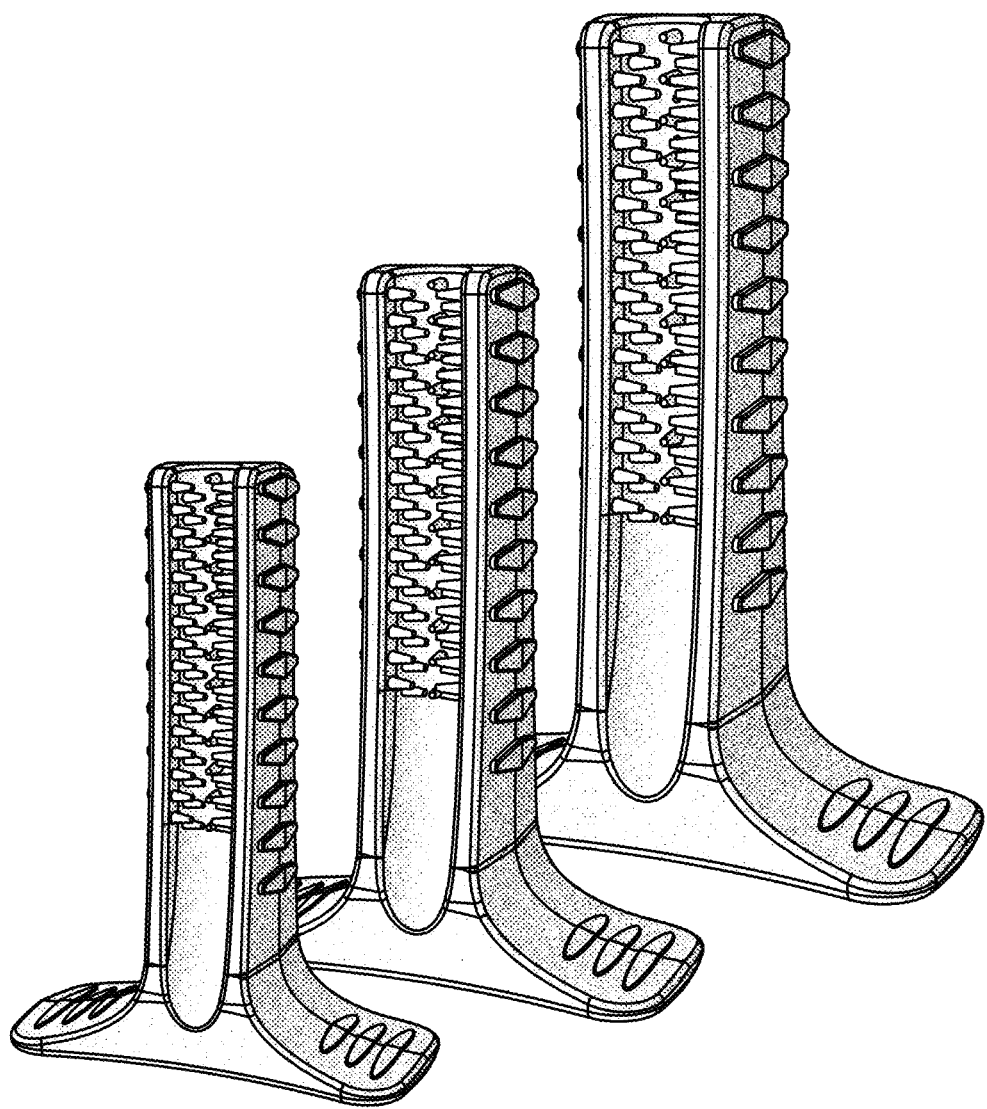
FIG. 6 shows a comparison between different possible sizes of an embodiment of the invention.

In one possible embodiment of the invention, as shown in FIG. 1, takes the form of a chew toy having a central member. The chew toy may be made of any suitable material, including by way of non-limiting example any non-toxic plastic. The central member comprises at least one inner surface, defining a cavity having an open end running the length of the central member and an additional open side at the top end of the central member. Said cavity should be of sufficient depth to allow full penetration by the front or back teeth of a domestic pet. The size of the central member, and therefore relative depth of the cavity, may be varied to suit a variety of domestic pet breeds, as shown in FIG. 6. By providing inner and outer surfaces for contact with the teeth and gums of a domestic pet, faster and more complete cleaning action is achieved on the pet's teeth and gums by maximizing the area of contact and friction between the central member and the pet's teeth and gums. In addition, further cleaning action is achieved by the simultaneous contact of the surfaces of the member with the forward and inner teeth of the pet.

Figure 2:
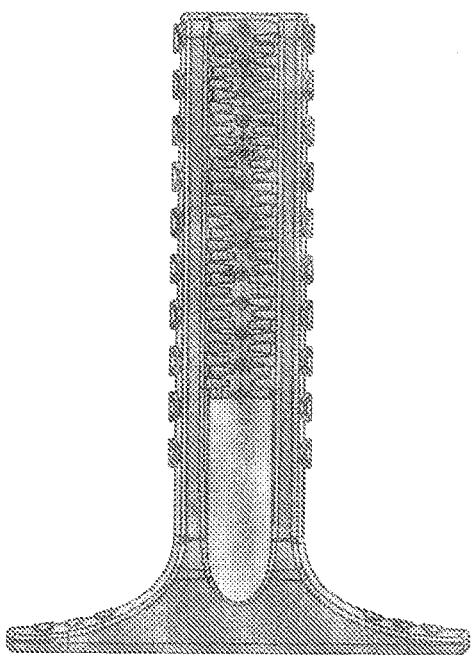
FIG. 2 shows a side-view of an embodiment of the invention, showing the multiplicity of scrubbing elements projecting from the inner surfaces defining the cavity, and the outer surfaces of the member.

As shown in FIG. 2, the outer surface of the central body may have affixed to it a plurality of scrubbing elements. As also show in FIG. 2, the inner surface defining the cavity may also have affixed to it an additional plurality of scrubbing elements.

The scrubbing elements affixed to the outer and inner surfaces may vary in size and shape. By way of example, they could take the form of bristles, pyramids, cones, rectangles, or any of a variety of other desirable configurations. The scrubbing elements affixed to the outer surface of the central member might, in one possible embodiment, be of a different shape or size than the scrubbing elements affixed to the inner surface, as shown in FIG. 2. Similarly, the size and shape of the scrubbing elements affixed to the inner surface might be the same as those affixed to the outer surface of the central member. This allows the scrubbing elements to be adapted to the differential spacing, tooth shape, and mouth size of a variety of domestic pets.

A further aspect of the present invention is shown in FIG. 1, comprising the substantially flat perpendicular projections. Although the embodiment shown in FIG. 1 has the projections take the form of two flanges or separate extensions, one of skill in the art will understand that the projection or projections can take a variety of shapes and sizes. Non-limiting examples might be a singular projection forming a circular base to the central member, or a multiplicity of flanges allowing a pet to grip the projections from a variety of angles. These projections allow a pet to fully stabilize the chew toy upright using their natural gripping action with the front paws.

In contrast to the rough or knobbed ends of natural bones or typical pet chew toys, here the domestic pet can fully pin down and stabilize the central member of the chew toy such that it is fully upright and immobile. This allows for a much strong grip on the central body by the mouth of the domestic pet, increasing the friction between the surface of the chew toy and the pet's teeth. This allows for superior cleaning and removal of plaque, leftover food, and other detrimental material from the mouth of the pet.

Figure 4:
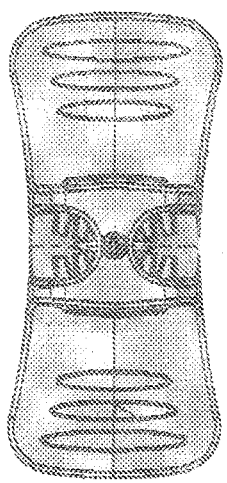
FIG. 4 shows a top-down view of the embodiment of FIG. 3, with the positioning for an optional additional reservoir to retain pet toothpaste shown at center.
Figure 5:
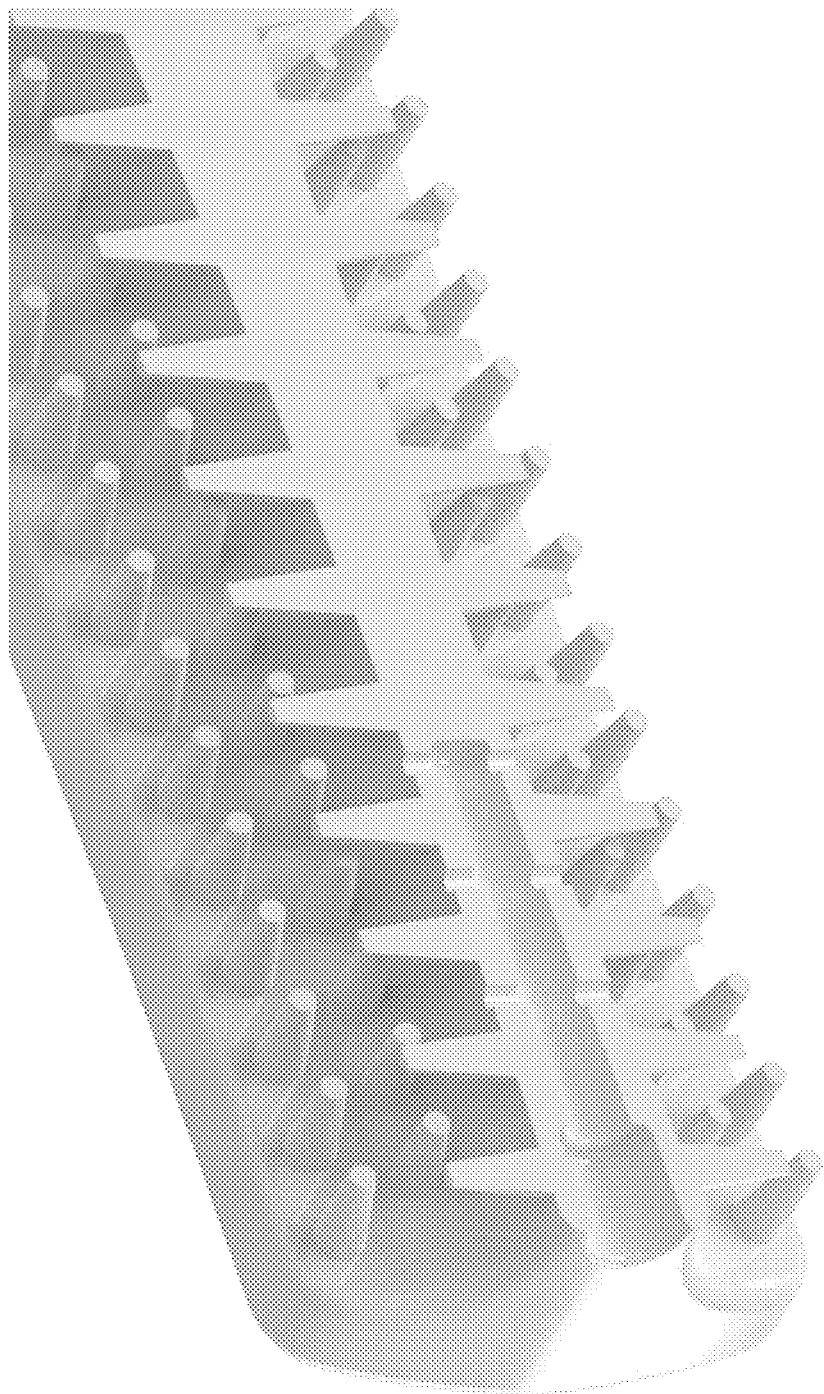
FIG. 5 shows a lengthwise cut-away of the central member of the embodiment of FIG. 3, demonstrating the shape and positioning of the additional reservoir, and smaller perpendicular holes for dispensing toothpaste retained in said reservoir.

Yet a further aspect of the present invention is shown in FIG. 4, showing one possible embodiment of the central reservoir for toothpaste or other substances suitable for dispensing. Here, the opening allows for input of a pet toothpaste or other appropriate substance into the reservoir, which is dispensed through perpendicular holes to the main cavity or cavities of the chew toy. Although in this particular embodiment the reservoir takes a cylindrical form, other embodiments might include one or more reservoirs of different shapes or locations.

Figure 3:
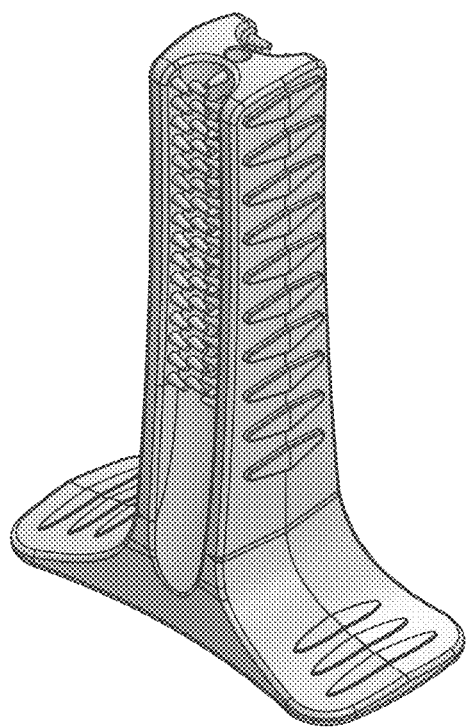
FIG. 3 shows an embodiment of the invention wherein the central member has inner surfaces defining two separate cavities.

Another possible embodiment of the present invention is shown in FIG. 3. Here, the central member comprises two inner surfaces, each defining separate cavities similar to the single cavity shown in FIG. 1. By providing a second cavity, a domestic pet can simultaneously engage not just the forward and rear of the pet's teeth and gums simultaneously, but on the top and bottom of the pet's mouth as well.

What is claimed is:

1. A chew toy for pet dental hygiene, comprising:
   a) a central chewing member,
      comprising:
      i) at least two U-shaped grooves that comprise, on at least a portion of all internal surfaces of said at least two U-shaped grooves, a plurality of protruding scrubbing elements;
   a) wherein said at least two U-shaped grooves generally define said central chewing member with a first and second end;
   b) further wherein said at least two U-shaped grooves are arranged parallel to each other and perpendicular, at said second end, to an at least one bottom stabilizing portion;
   c) further wherein said at least two U-shaped grooves are each substantially the length of said central chewing member;
   d) further wherein said at least two U-shaped grooves are positioned on opposing sides of said central chewing member;
   e) further wherein each said at least two U-shaped grooves is generally U-shaped in cross section across said central chewing member;
   ii) a plurality of nub shaped elements positioned on an outside surface of said central chewing member,
   iii) at least one central aperture in said first end of said central chewing member and an at least one longitudinal cavity that begins at said aperture and runs at least a portion of the length of said central chewing member;
   iv) at least one dispensing hole communicating between said at least one longitudinal cavity and said at least two U-shaped grooves, wherein said at least one dispensing hole is perpendicular to said at least one longitudinal cavity;
b) said at least one bottom stabilizing portion, comprising:
   i) at least one substantially flat projection that stabilizes said chew toy when in use;
   ii) wherein said at least one projection is perpendicular to said central chewing member;
   iii) wherein said at least one bottom stabilizing portion is configured to stabilize said chew toy in an upright position; and
wherein said chew toy is a unitary structure made of non-toxic material.

2. The chew toy of claim 1,
wherein at least one of said at least two U-shaped grooves are sufficiently deep to clean teeth to the gum line.

3. The chew toy of claim 1,
wherein said protruding scrubbing elements comprise bristles.

4. The chew toy of claim 1,
wherein said at least one longitudinal cavity is configured to hold at least one substance.

5. The chew toy of claim 4,
wherein said substance comprises toothpaste.

6. The chew toy of claim 1,
wherein said at least one dispensing hole is adapted to transfer at least one substance between said at least one longitudinal cavity and said at least two U-shaped grooves.

7. The chew toy of claim 6,
wherein said substance comprises toothpaste.

8. The chew toy of claim 1,
wherein said pet comprises a dog.

9. The chew toy of claim 1,
further wherein said chew toy is operable as a toothbrush for use by pets to brush their own teeth.

10. The chew toy of claim 1,
wherein when chew toy is in use, multiple teeth and multiple surfaces of teeth are cleaned.

11. The chew toy of claim 1,
wherein said chew toy comprises a single, unitary structure.

12. The chew toy of claim 1,
wherein said chew toy comprises natural rubber.

13. A method of promoting pet dental hygiene, comprising:
   a) providing a pet in need of promotion of dental hygiene;
   b) providing a chew toy of claim 1;
   c) allowing said pet to engage with said chew toy;
wherein the dental hygiene of said pet is promoted.

14. The method of claim 13,
wherein said chew toy comprises toothpaste.

15. The method of claim 13,
wherein said pet comprises a dog.

16. The method of claim 13,
wherein at least one of said at least two grooves are sufficiently deep to clean teeth to the gum line.

17. The method of claim 13,
wherein when chew toy is in use, multiple teeth and multiple surfaces of teeth are cleaned.

\* \* \* \* \*